US006836898B1

(12) United States Patent
Yates et al.

(10) Patent No.: US 6,836,898 B1
(45) Date of Patent: Dec. 28, 2004

(54) SUBSCRIBER POWER MODULE FOR CATV CUSTOMER INTERFACE EQUIPMENT

(75) Inventors: James R. Yates, Manlius, NY (US); Willard Williamson, Syracuse, NY (US)

(73) Assignee: Broadband Royalty Corporation, Wilmington, DE (US)

( * ) Notice: Subject to any disclaimer, the term of this patent is extended or adjusted under 35 U.S.C. 154(b) by 0 days.

(21) Appl. No.: 09/217,430

(22) Filed: Dec. 21, 1998

(51) Int. Cl.[7] .............................................. H04N 7/173
(52) U.S. Cl. ......................... 725/128; 725/79; 725/127; 725/130
(58) Field of Search .............................. 725/130, 150, 725/82, 83, 149, 79, 119–121

(56) References Cited

U.S. PATENT DOCUMENTS

| 4,575,750 | A | * | 3/1986 | Callahan .................... 725/34 |
| 4,577,221 | A | | 3/1986 | Skinner, Sr. et al. .......... 358/86 |
| 4,760,597 | A | * | 7/1988 | Hayes et al. ................ 725/109 |
| 5,109,286 | A | * | 4/1992 | West ......................... 358/349 |
| 5,436,822 | A | * | 7/1995 | West ........................... 363/63 |
| 5,467,384 | A | * | 11/1995 | Skinner ....................... 379/66 |
| 5,764,734 | A | * | 6/1998 | Medendorp .............. 379/90.01 |
| RE35,901 | E | * | 9/1998 | Wilkison .................... 379/406 |
| 5,845,190 | A | * | 12/1998 | Bushue ....................... 455/3.3 |
| 5,878,325 | A | * | 3/1999 | Dail ........................... 455/5.1 |
| 5,983,068 | A | * | 11/1999 | Tomich ...................... 455/3.1 |
| 6,055,435 | A | * | 4/2000 | Smith et al. ................ 455/462 |
| 6,305,020 | B1 | * | 10/2001 | Hoarty et al. ................. 725/95 |

FOREIGN PATENT DOCUMENTS

WO          9326123          12/1993          .......... H04N/7/167

* cited by examiner

*Primary Examiner*—Vivek Srivastava
*Assistant Examiner*—Reuben M. Brown
(74) *Attorney, Agent, or Firm*—Oblon, Spivak, McClelland, Maier & Neustadt, P.C.

(57) ABSTRACT

A CATV system has a multitude of customer interfaces which include an external unit and an internal unit. The units includes equipment for signal conditioning, cable to telephone interface, and/or cable to computer interface. The internal unit is provided with power by the customer, and the power is used to operate the equipment of the units. The customer supplied power is isolated from the power distributed in the cable television system. Preferably, the customer supplied power is conducted through the coaxial television cable between the internal unit and the external unit. The invention reduces power consumption and allows such customer interfaces to be easily added to existing and future cable systems without overwhelming the existing AC power distribution system of the cable television network.

23 Claims, 7 Drawing Sheets

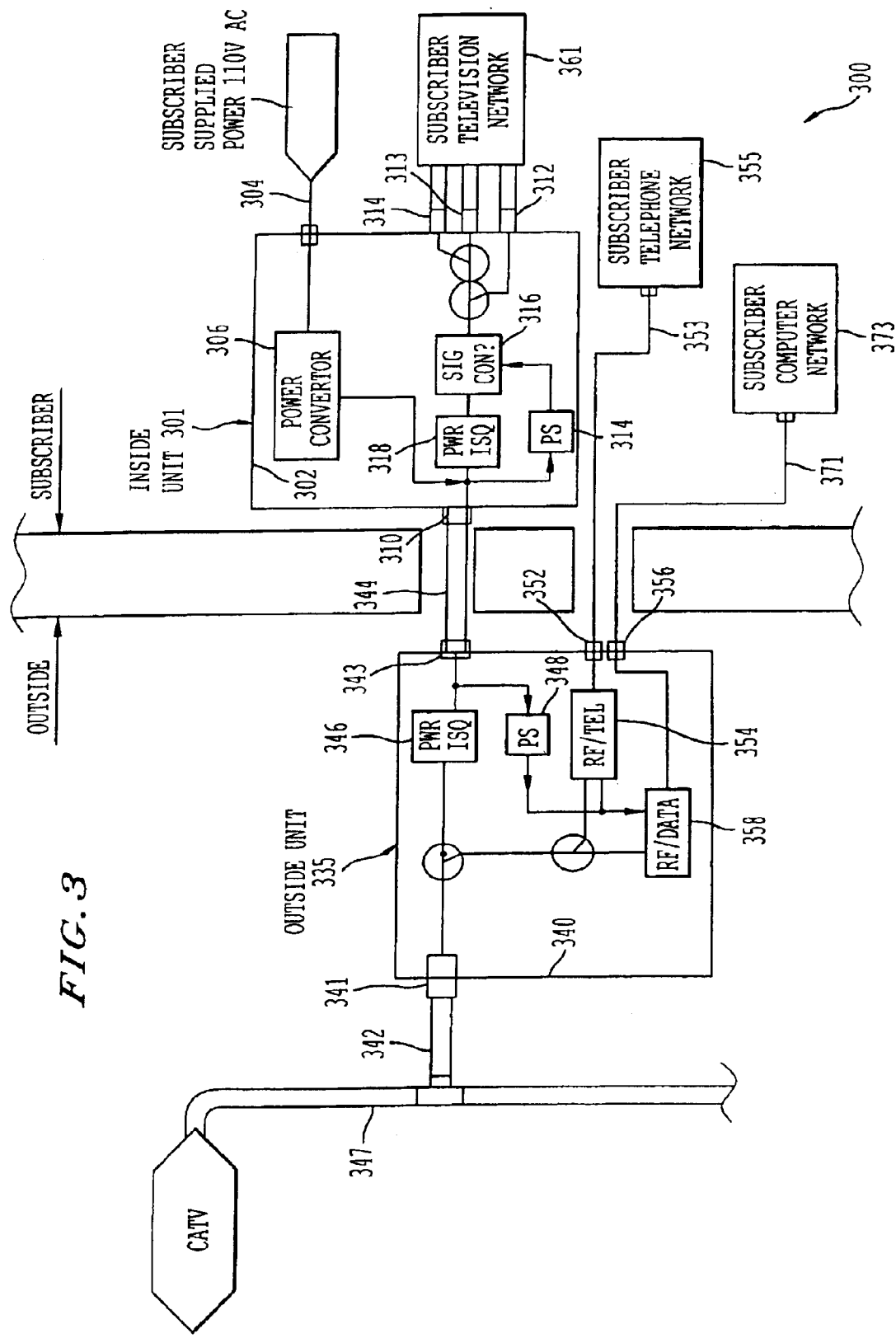

SUBSCRIBER POWER MODULE FOR CATV CUSTOMER INTERFACE EQUIPMENT

FIELD OF THE INVENTION

This application relates to the field of community antenna television (CATV) systems and more specifically to arrangements for customer interfaces used in such CATV systems.

BACKGROUND

In CATV systems, a system operator broadcasts television programs through a fiber optic network tree from a head-end to a multitude of network nodes, and then through coaxial cable network trees from each node to a respective multitude of network terminations at customer locations. A central power supply provides AC power to the CATV system, and the power is distributed through a conductor tree to the nodes and then through the coaxial network trees. The AC power is used to provide power to the nodes and to in-line signal amplifiers in the coaxial network trees. In the nodes and amplifiers, the AC power is converted to DC power to operate various electronic equipment.

The optical fiber tree may extend up to 100 Km and the coaxial system may extend many more kilometers to customer locations. In CATV systems, the head-end may be connected to hundreds of nodes, and each node may be connected to hundreds of customers.

Equipment is being developed to allow cable television networks to also be used for providing other communication services such as telephone, security monitoring, and Internet connection. Customer interface units at customer locations share a few available channels for communication through the coaxial cable network. Additional optical fiber network trees are provided to transport return signals from the nodes back to the head-end and to provided additional bandwidth for communications from the head-end to the node.

SUMMARY OF THE INVENTION

It is an object of the invention to provide user interface apparatus to allow existing CATV systems to provide additional data services such as phone, Internet, and security monitoring.

It is another object of the invention to provide user interface apparatus for new CATV systems which reduce energy consumption.

In the invention, the user interface apparatus consists of an inside unit and an outside unit. The inside unit is connected to standard consumer power (e.g. 110V) so that the interface draws less power from the CATV power distribution network. The power provided from the standard customer power is isolated from the power distributed by the CATV network.

In one embodiment of the invention, power drawn from standard consumer power by the inside unit is stepped down in voltage and transferred to operate equipment in the outside unit for signal processing.

In another embodiment of the invention customer service equipment and signal processing is provided by the inside unit.

In existing CATV systems, the central power supply and the conductor tree extending to the nodes are typically designed to provide power only for existing nodes and amplifiers and possibly for some expected system expansion. The power required for operating user interfaces required to provide additional communications services, for hundreds of customers for each node, could be 1–3 orders of magnitude more than existing CATV power requirements. The invention allows adding user interface apparatus to existing systems without providing a new high power AC distribution system to the CATV system.

For new CATV systems it is more energy efficient to provide power for user interface apparatus from the customer's standard consumer power. A complete, high-current, consumer power distribution system already exists to provide customers with electrical power. The resistances through this high-current network, are relatively small since the consumer power system is economically designed for large currents. It would be redundant and inefficient to provide another power distribution system for customer interface equipment. The CATV power distribution system is typically less energy efficient than the standard consumer power system, because it is economically designed for much smaller loads over a large area.

Other alternatives and advantages of applicant's inventions will be disclosed or become obvious to those skilled in the art by studying the detailed description below with reference to the following drawings which illustrate the elements of the appended claims of the inventions.

BRIEF DESCRIPTION OF THE DRAWINGS

FIG. 3 shows another embodiment of the customer interface of the invention.

DETAILED DESCRIPTION OF THE DRAWINGS

Figure 1:
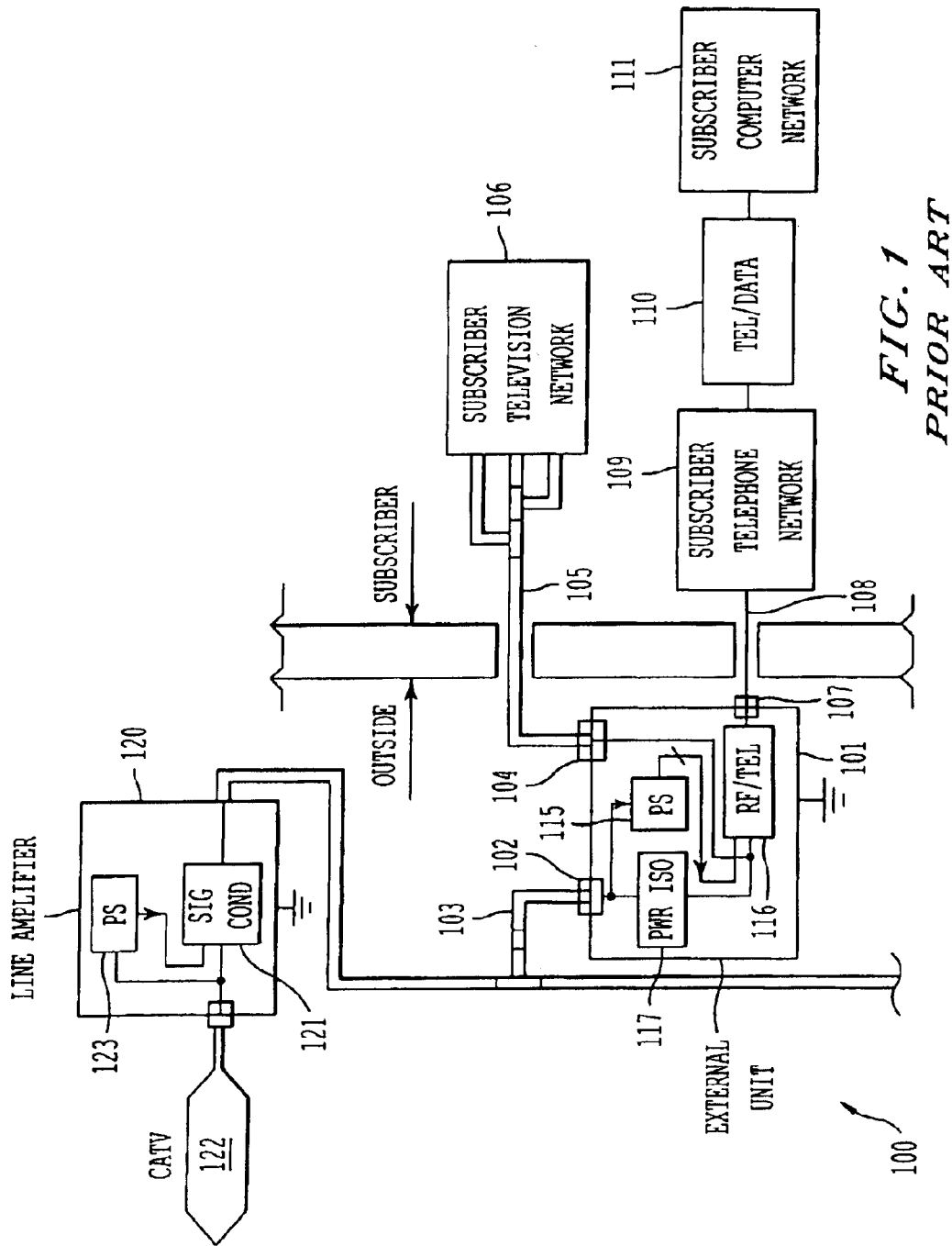
FIG. 1 schematically illustrates a current customer interface for providing additional communication services in a CATV system.

In FIG. 1, customer interface 100 (network terminator) includes external unit 101. The external unit has first connection 102 for external coaxial cable 103 and second connection 104 for internal coaxial cable 105. The internal coaxial cable is routed into the customer space (e.g. home of the customer) and connected to a subscriber television network 106. The subscriber television network includes one or more components of television equipment such as monitors, video tape recorders, digital video disks systems, audio systems which are interconnected, for example, by coaxial cables.

The external unit also has telephone connection 107 for telephone wiring 108 routed into the customer space. The telephone wiring is connected to customer telephone network 109 of one or more telephones interconnected by telephone wiring. A computer modem 110 can be connected between the customer telephone network and computer network 111 of one or more computers interconnected by computer network wiring.

The exterior unit contains DC power supply 115, such as a switch-mode power supply, which supplies direct current (DC) power at one or more voltages to electronic equipment within the exterior unit. The power supply is provided with AC power (35–90 V AC) from the power distribution system of the CATV network through the external coaxial cable 103. The power is used to operate electronic equipment, for example, telephone modem 116 may be included to convert between radio frequency (RF) signals in a channel in external coaxial cable 103 and analog phone signals in telephone wiring 108. One or more wires connect between the power supply and the modem as shown.

The external unit may also provide power isolator 117 between the exterior coaxial cable carrying 30 to 90 volts and the interior coaxial cable connected to the customer's television network. Even though the cable distribution power is of significantly lower voltage than typical consumer power, and the internal conductor can not normally be contacted by the customer, it is preferred that, the customer and his equipment be protected from shock due, for example, to lighting strikes.

Locating all the customer interface equipment in an external unit allows the equipment to be easily installed and maintained without having to enter into the customer's building space.

Line amplifier 120 contains electronic equipment including signal conditioner 121 to amplify and filter the signals traveling in both directions between external cable 103 and other parts of CATV system 122. The line amplifier also includes DC power supply 123 (similar to power supply 115 of the customer interface) which provides one or more DC voltage levels for use by signal conditioning equipment in the line amplifier.

Figure 2:
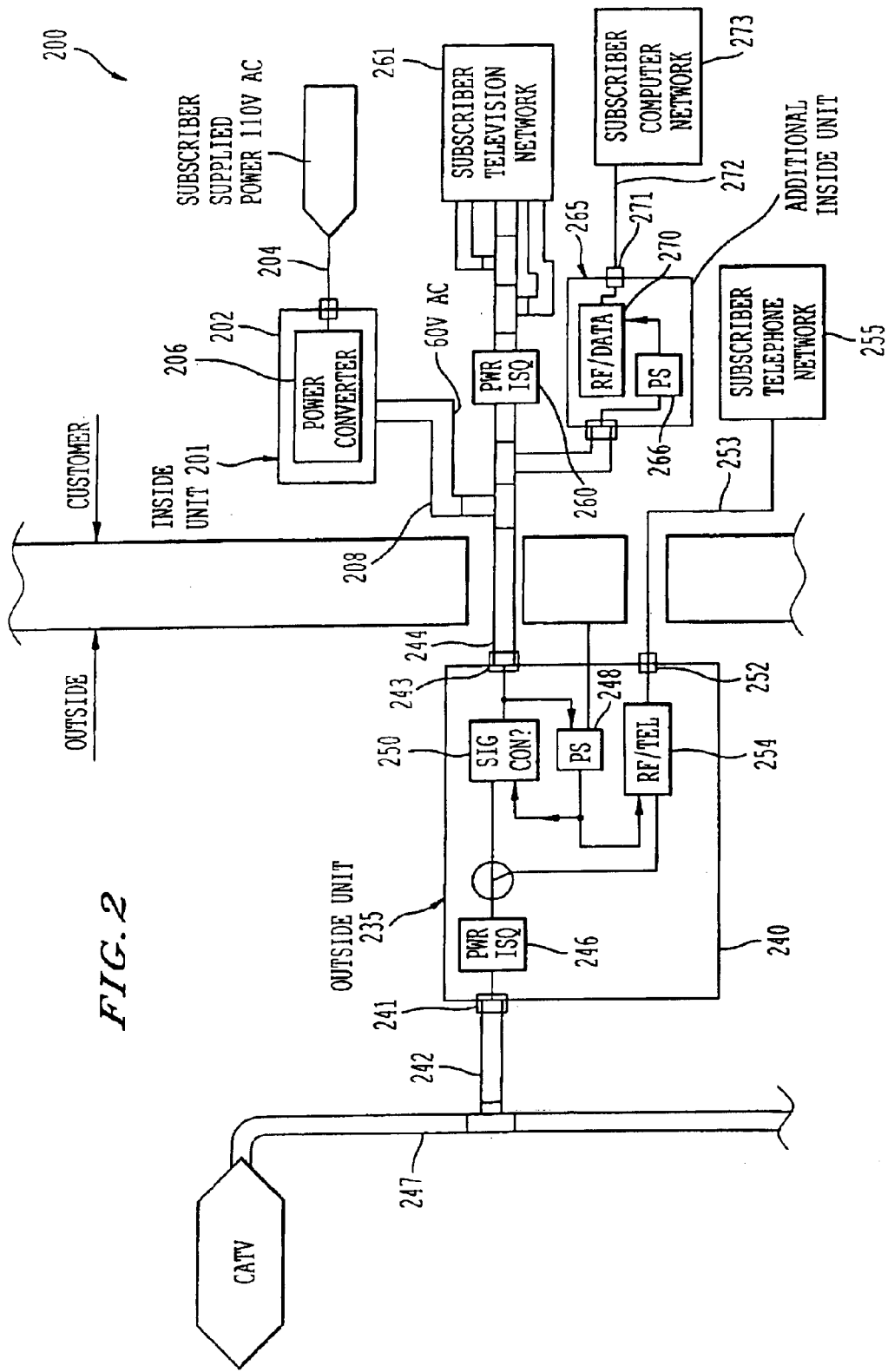
FIG. 2 illustrates an embodiment of the customer interface of the invention.

FIG. 2 shows a first example embodiment of the invention. In FIG. 2, customer interface 200 includes interior unit 201 located in the customer's building space and exterior unit 235, which is accessible from outside the customer's building space. The interior unit includes enclosure 202 for the equipment of the interior unit and electrical connector 204, such as a power cord, for connecting the interior unit to standard consumer power in order to receive high voltage alternating current input power, for example, at 110V AC. The interior unit includes converter 206, such as a transformer, which converts the 110 V AC input into lower voltage AC output power, preferably, between 12 and 90 volts, more preferably, between 30 and 60 volts. Equipment used by each customer for interfacing with the cable television system is not expected to require more than a few watts which even at 12 volts would require less than 1 amp of current. The interior unit also includes one or more connectors 208 for connecting the interior unit to a coaxial television cable to provide the lower voltage alternating current output to the coaxial cable. The unit may have a single connection for a branch cable, as shown, or the unit may have separate connections for an input coaxial cable and an output coaxial cable. Only the input coaxial cable needs to be energized. The lower voltage AC power is used to operate any other equipment contained within the interior unit and the power supplied to the coaxial cable is used to operate other electronic equipment connected to the cable such as equipment contained in the exterior unit.

Exterior unit 235 of the cable television customer interface, includes weatherproof enclosure 240 with input connection 241 for first coaxial cable 242 and output connection 243 for second coaxial cable 244. The exterior unit contains AC power isolator 246 for electrically isolating internal power (supplied from the interior unit by the customer in the second cable) from the CATV network of the first cable and for simultaneously conducting RF signals bidirectionally between the first and second cables. Power isolator 246 may be located in an additional external unit positioned between the common wire 247 and connector 241 or in the external unit as shown. Alternatively, power isolator 246 may also be used to isolate higher voltage AC power distributed by the CATV network from damaging equipment in the customer interface or being used to power the customer interface. For example, power from the CATV system may be isolated at the node or in a second external unit (not shown) located between the node and connector 241.

The exterior unit in this embodiment also contains direct current power supply 248 for converting the AC power (provided by the customer using the interior unit) in the second cable into direct current at one or more voltages for operating other electronic equipment contained in the exterior unit. The exterior unit may also contain signal conditioning equipment 250 for conditioning RF signals received from first cable 242 to provide conditioned RF signals in second cable 244. The conditioning equipment may also provide conditioning for return signals such as those from modem 270 described below. The conditioning equipment is described in detail below in relation to FIG. 6.

The exterior unit may also include telephone modulator demodulator (modem) 254 for converting between RF signals in the first or second coaxial cable and telephone signals in telephone wiring. The telephone signals are routed to telephone wiring connection 252, through telephone wiring 253, and into customer's telephone network 255. The customer's telephone network may include one or more phones interconnected by the telephone wiring in the customer's building space.

Conditioning equipment 250 and modem 254 are electrically connected to operate from the DC power provided by power supply 248.

Second power isolator 260 may be provided, to separate the portion of the coaxial cable electrified by the interior unit of the customer interface from the customer's television network 261. The second isolation protects the subscriber's television network and the customer from faulted conditions such as short circuits or interior or exterior lighting strikes. A similar customer television network 106 is described above with reference to FIG. 1.

Additional inside units, such as unit 265 of the customer interface, may be provided with AC power from the coaxial cable. Each unit will require a DC power supply, such as power supply 266, to convert the AC power to DC power in order to operate electronic equipment within the additional unit. In this specific example, the additional inside unit includes computer modem 270 for converting between RF signals in the second cable and digital computer signals in a connected computer. The additional inside unit has computer network connection 271 to connect computer wiring 272 to computer network 273 which is similar to network 111 of FIG. 1.

FIG. 3 illustrates a second specific example embodiment of the computer interface of the invention. In this second embodiment, customer interface 300 includes inside unit 301 and outside unit 335. Inside unit 301 includes enclosure 302 containing power converter 306 connected to receive consumer power through connector 304 and to provide lower voltage AC power to second coaxial cable 344. Outside unit 335 includes weatherproof enclosure 340 containing power isolator 346 for isolating power in first coaxial cable 342 at connector 341 from power in cable 344 connected at 343. The outside unit also contains telephone modem 354 and power supply 348 which provides power to the telephone modem. Telephone signals are routed from the telephone modem, out of the outside unit through connector 352, through telephone wiring 353, to subscriber telephone network 355. Details and operations of the above portions of the second embodiment are similar to portions of the first embodiment described in more detail above with reference to FIG. 2.

In the first embodiment, the inside unit was connected in parallel with the subscriber television network, but in the second embodiment the inside unit is connected serially in-line between the outside unit and the subscriber's television network. In the second embodiment, the inside unit also includes DC power supply 314 for converting the AC power (provided by power converter 306 to the second cable) into direct current at one or more voltages which is used for operating other electronic equipment of the interior unit.

The interior unit in the second embodiment, may also contain signal conditioning equipment 316 for conditioning RF signals received from first cable 342 to provide conditioned, RF signals to subscriber television network 361 which is similar to television network 106, described above with reference to FIG. 1. The conditioning equipment is connected to power supply 314 for operation and the details of the conditioning equipment are described below in more detail in relation to FIG. 6. Second power isolator 318 may be provided, to separate voltages of the second coaxial cable (electrified by the interior unit of the customer interface) from the CATV network, in order to protect the subscriber's television network 361 and the customer from faulted conditions such as short circuits or interior or exterior lighting strikes. The signal conditioning equipment is preferably placed between the interior power isolator and the customer's television network. The inside unit also provides connector 310 for the second coaxial cable and multiple connectors 312, 313, and 314 to connect the customer's television network to the interior unit. The multiple connectors simplify the routing of the customer's television network.

Outside unit 335 in this embodiment does not include signal conditioning, since signal conditioning is performed by inside unit 301. The outside unit includes computer modem 358 for bidirectionally converting signals between RF signals in the second cable and digital computer signals. The outside unit includes computer network connection 356 to route the computer signals from the computer modem, through computer wiring 272, to computer network 273 which is similar to computer network 111 of FIG. 1.

Figure 4A:
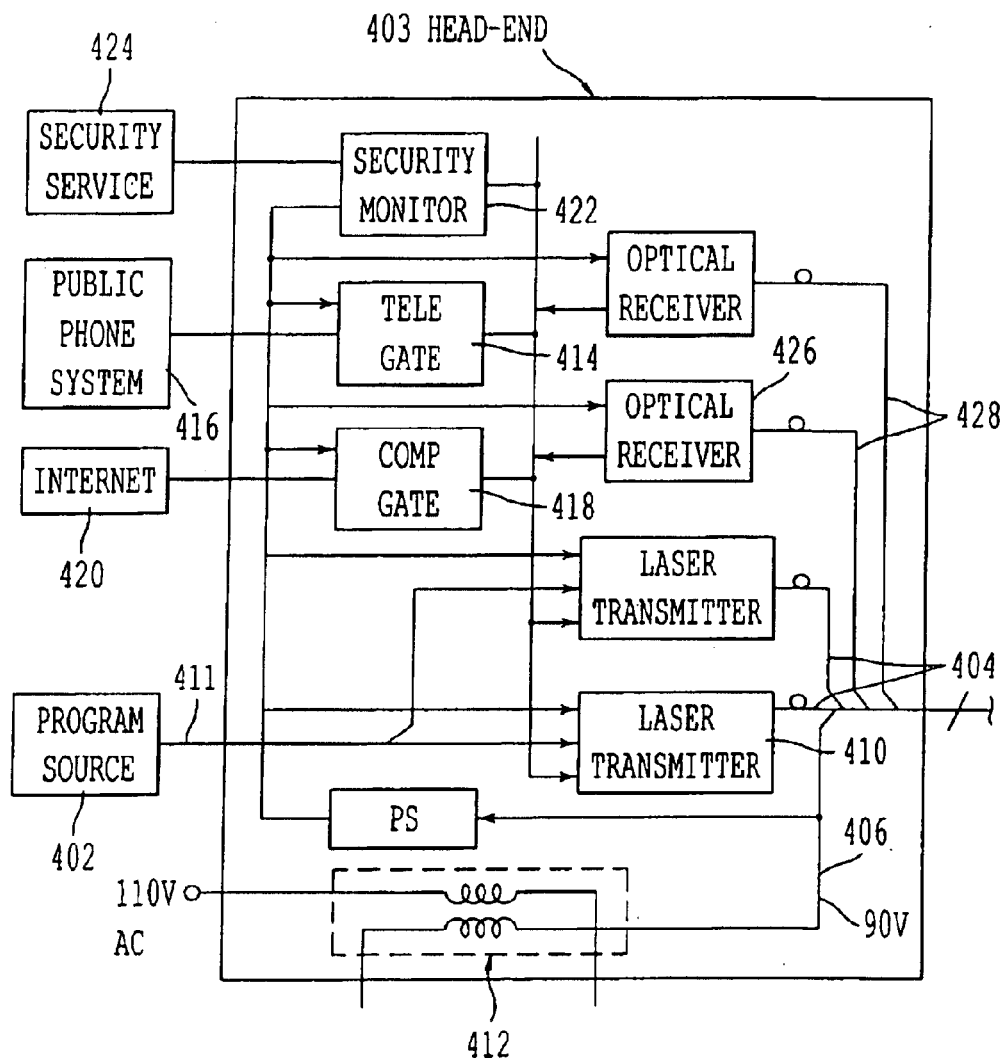
FIG. 4 illustrates a CATV system of the invention in which the customer interfaces are connected to consumer power.
Figure 4B:
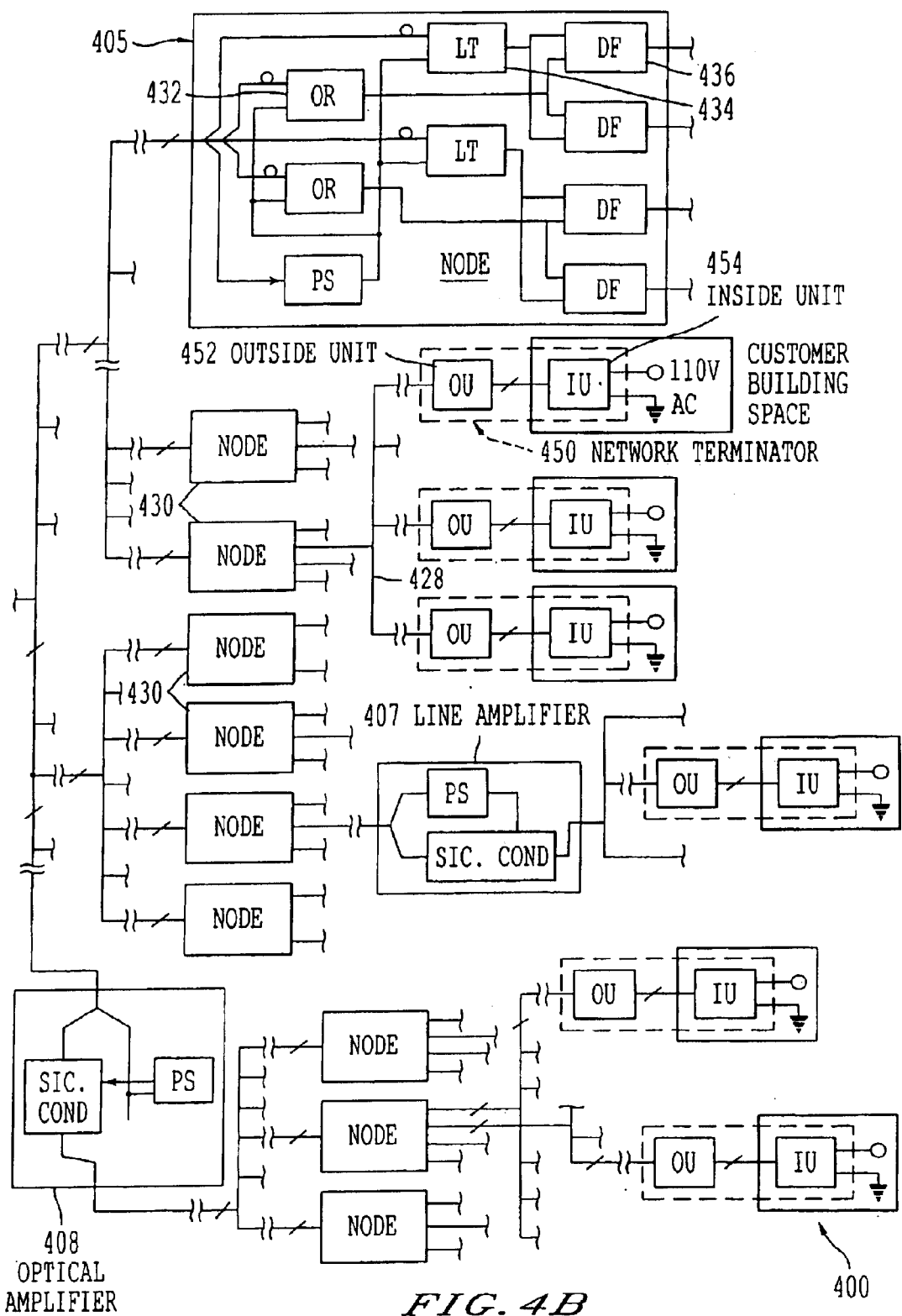

FIG. 4 schematically illustrates the overall CATV system 400 of the invention. The cable television network includes equipment 402 for receiving multimedia programs at head-end 403. The programs may be provided to the cable operator at the head-end from a local studio, a remote studio by a satellite downlink, a video tape and tape player, or by other equipment commonly used to provide television programs to cable operators. One or more optical cable network trees 404 rout the television programs as optical signals foreword from the head-end to a multitude of network nodes 430 (e.g. hundreds of nodes commonly as far as 100 Km away from the head-end). Many CATV networks include multiple foreword optical cables to provide multicasting in which different geographical areas or different types of customers receive different commercials and/or receive different programs. Also, CATV networks that provide additional communication services such as telephone, Internet connection, or security monitoring, may provide a multitude of foreword optical cables to provide the required bandwidth in order to provide these services. Conductor network tree 406 is coextensive with the optical cable network trees in order to provide AC power to operate the network nodes, to operate electrical signal amplifiers 407 (line amplifiers), and possibly to operate optical signal amplifiers 408 (especially in digital systems).

Head-end 403 includes one or more laser transmitters 410 for receiving the programs as RF electrical signals through cables 411 from the source equipment, for using the electrical signals to modulate a laser beam to convert the television program into optical signals, and for transmitting the programs into the optical cable network trees. Central source 412 of power for the CATV network, receives AC power, for example, at 110 or 220 volts, steps the voltage down to 60 to 90 volts, and transmits the lower voltage AC power through conductor network tree 406.

Preferably, the head-end of the invention includes equipment for providing other communication services such as telephone, Internet (and/or other computer communication), security monitoring, and/or other services.

A multitude of coaxial cable network trees 428 extend from the nodes to customer interfaces (commonly called network terminators). The coaxial cables carry both the program signals and AC power for operating in-line signal amplifiers.

Each of nodes 430, include one or more optical signal receivers 432, for receiving the multimedia programs and forward information as optical signals from respective optical network trees and for transmitting the programs and forward information through one or more of the coaxial cable network trees 428.

A multitude of customer interfaces 450 are each connected to one of the coaxial cable network trees 428. The customer interfaces include exterior unit 452 which can be accessed from outside the customer building space and interior unit 454 which is inside the customer building space. The interior units are provided with standard consumer power, from inside of the customer's building space, by the customer. The customer interfaces provide television cable and additional communication services such as telephone, Internet connection, and/or security monitoring. These services require transmission of signals from the customer interfaces back through the coaxial cable trees to the nodes and back through return optical cables to the head-end. The head-end is provided with equipment for communicating with the telephone system, the Internet, and/or with security service providers.

In order to provide these additional services, the nodes further include diplex filters 436 for separating the return signals from the foreword signals in a respective coaxial cable network. One or more laser transmitters 434 receive the return information from one or more of the coaxial cable network trees (through respective diplex filters) and use the return information to modulate a laser beam for transmitting the return information through another one or more of the optical network trees. The laser transmitters are connected to the same coaxial network trees as the optical receivers. In addition, the head-end further includes gateways which are computers that provide interconnection between information networks. The gateways provide forward information and receive return information in order to provie the additional services. In this particular embodiment, telephone gateway 414 communicates with the public telephone network 416 to provide telephone services, computer network gateway 418 communicates with the Internet 420 to provide Internet services, and security monitor gateway 422 communicates with a security service 424 to provide security services.

One or more of laser transmitters 410 are adapted for receiving the forward information from the gateways and transmitting the forward information as optical signals into optical cable networks 404. The same transmitters may be used for television programming and additional communication services or different transmitters may be used for different services. The transmitters are connected by cables extending from the gateways and selectively receive information from the program source and the gateways to provide the required information to the nodes and subsequently to the customer interfaces. The head-end also includes one or more optical receivers 426 for receiving the return information as optical signals from respective return optical trees 428. The optical receivers selectively transmit the return information to the gateways.

Figure 5:
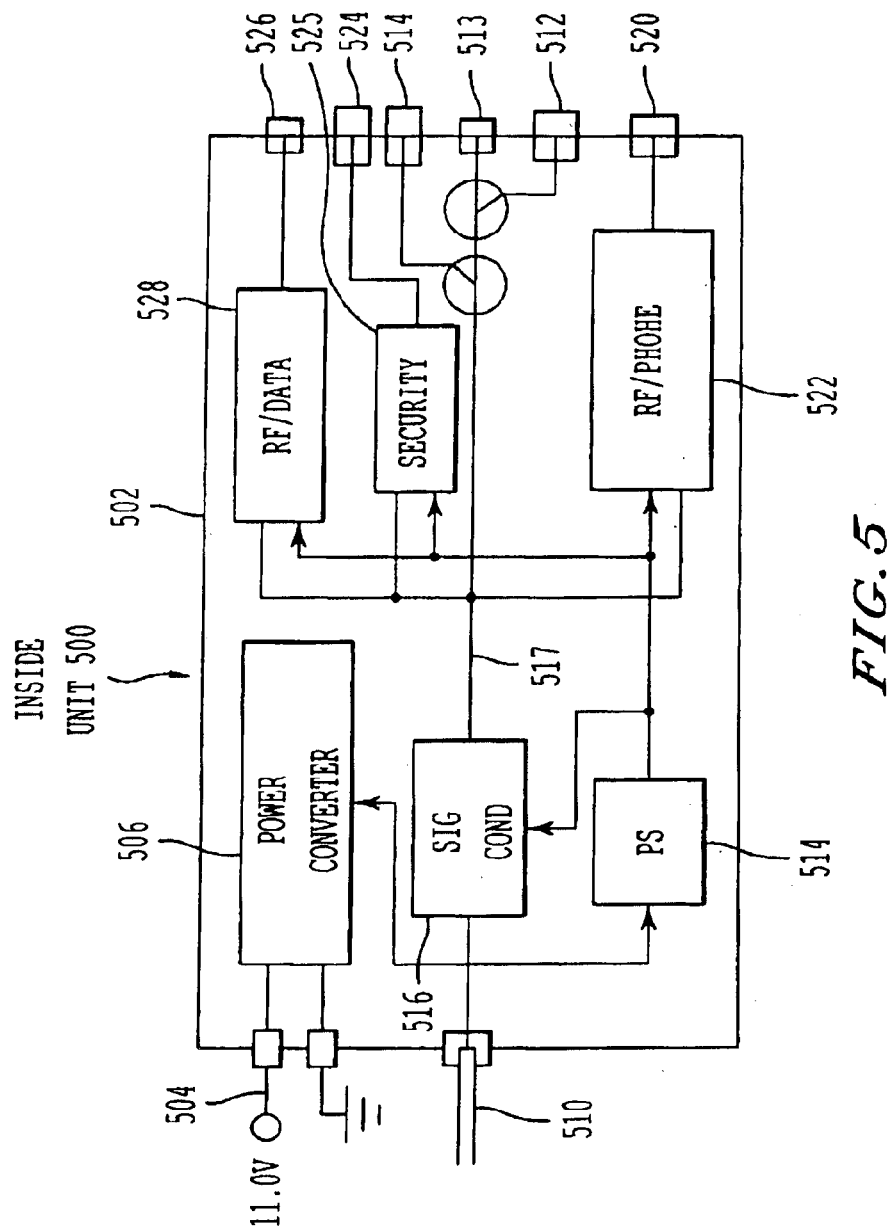
FIG. 5 provides details of an inside unit of the invention.

FIG. 5 illustrates another embodiment of inside unit 500 of the consumer interface. Preferably, all the equipment of the 35 inside unit is contained in single enclosure 502. In this specific example, power converter 506 is provided with standard consumer power (110V or 220V at 50 or 60 Hz) through connection 504, such as a power cord or power cord connection. The converter provides lower voltage AC to DC power supply 514. The DC power supply in turn, provides power at one or more DC voltages to other electronic equipment of the inside unit.

Unlike the other embodiments of the inside unit, in this embodiment the power converter does not provide power to the coaxial cable. For this reason, there is no need for additional isolation to separate the power output of the converter from the CATV network. In addition, this embodiment includes more communication service equipment within the inside unit.

Connector 510 is provided for an input coaxial cable and connectors 512, 513 and 514 are provided for output coaxial cables. The forward signal provided at coaxial input connector 510 is conditioned by signal conditioner 516 and the conditioned forward signal is provided to output cable 517 which is routed to connectors 512, 513 and 514. The equipment of the conditioner is described in more detail below with reference to FIG. 6. The multitude of coaxial output connections 512–516 simplifies the task of connecting up the customer's television network.

The customer's telephone network (not shown) may be connected to telephone connector 520 to provide telephone communications services. Telephone modem 522 is connected between output cable 517 and the telephone connector to convert between RF signals and telephone signals (digital or analog). A customer security monitoring system (not shown) may be connected to security connector 524 to allow a security service to monitor the status of home security devices. Security modem 525 connects between the security connection and the output cable. A customer computer network (not shown) may be connected to computer connector 526 to provide high speed computer communication through the CATV system (using ISDN, Ethernet, or other communication method). A computer modem 528 connects between the output cable and the computer connection to convert between computer signals in the CATV system and computer signals in the customer's computer network. Note that the term modem is used herein to describe any gateway equipment for converting between different communication systems whether RF analog to analog, digital to RF analog, or digital to digital.

Figure 6:
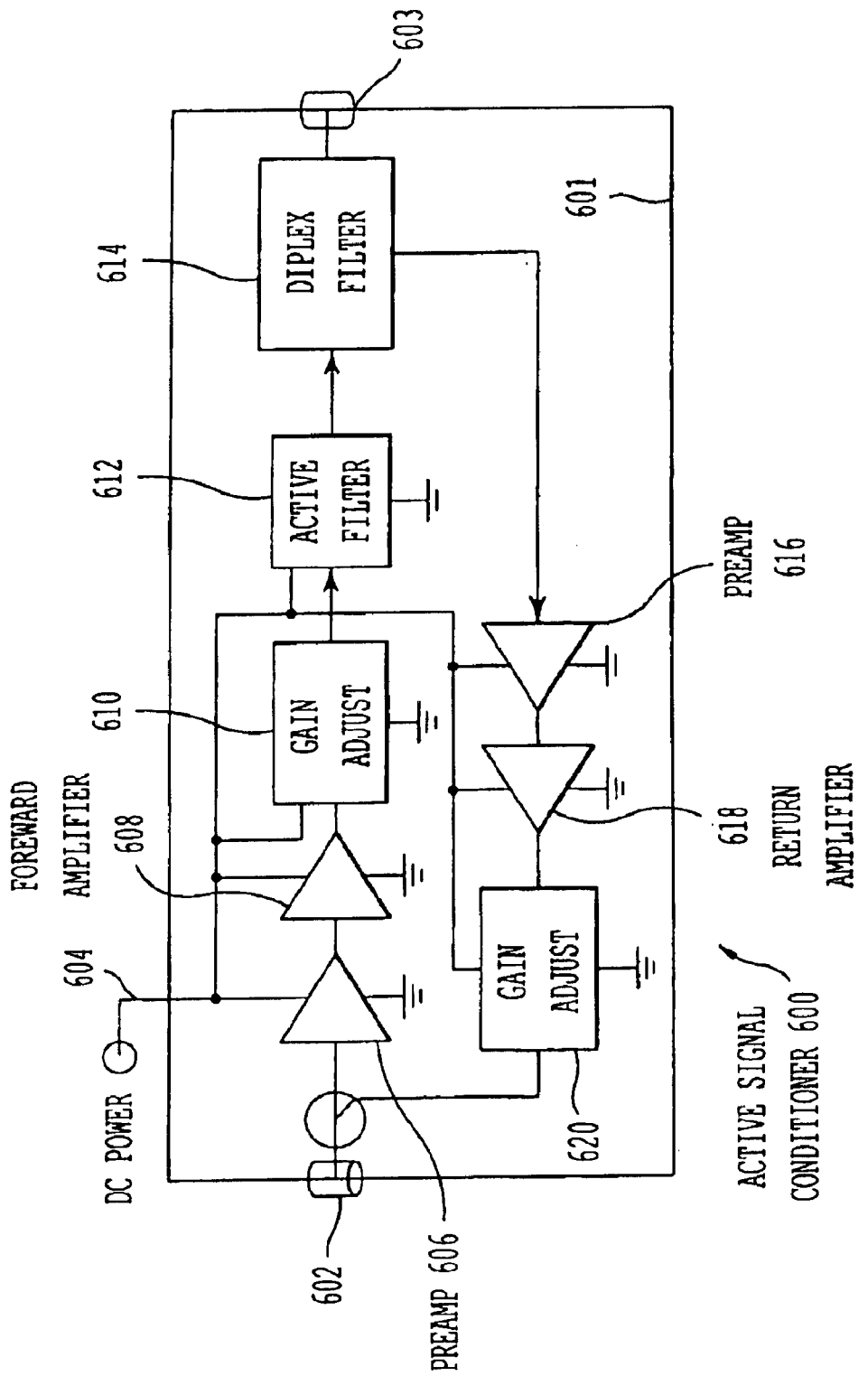
FIG. 6 illustrates a signal conditioner of the invention.

FIG. 6 illustrates active signal conditioning equipment of the user interface of the invention. Conditioning equipment may be used to condition the foreword signals or the return signals or both. The signal conditioning equipment may be contained in an enclosure 601 as shown, in order to provide an integrated conditioner unit, or may be distributed elsewhere in the customer interface or a combination of these may be provided. Connector 602 allows connecting an input cable for receiving forward signals and transmitting return signals and connector 603 allows connecting an output cable for transmitting foreword signals and receiving return signals. Connector 604 provides routing for electrical power conductors with one or more different respective voltage levels.

Preferably the active signal conditioning equipment for the foreword signals includes an amplifier, gain adjust 610, and active filter 612. The amplifier is preferably a multistage amplifier, such as, provided by preamplifier 606 and power amplifier 608. Gain adjust 610 dynamically adjusts the gain of the amplification depending on, for example, system configuration. Active filter 612 filters out undesirable frequencies. Diplex filter 614 is provided to allow return signals to travel from the output cable connector to the input cable connector.

Signal conditioning may also be required for the return signals. Such equipment can be provided in the return line between the diplex filter and the input cable connector. Preferably, the return signal conditioning equipment includes first stage amplifier 616 and second stage amplifier 618. Also, the return conditioner may include active gain adjust 620 for the return signal. Other signal conditioning equipment (not shown) can also be included such as slope adjustment or phase adjustment. In addition presence signals, status signals, or measurement signals may be provided.

The invention has been described with reference to specific embodiments including the best mode for carrying out the invention, and with sufficient detail that anyone skilled in the art can make and use the invention. Those skilled in the art may modify these embodiments or provide other embodiments within the spirit of the invention, and thus, the description does not limit the present invention to the disclosed embodiments. The invention is limited only by the following appended claims.

We claim:

1. An interior unit of a cable television customer interface, comprising:
   an enclosure for the interior unit;
   means for connecting the interior unit to standard consumer power to receive higher voltage AC input;
   first means for converting the higher voltage AC input into lower voltage AC output;
   second means for converting the lower voltage AC output into DC power;
   means for connecting the interior unit to a first coaxial cable to provide the lower voltage AC output to the first coaxial cable; and
   means for conditioning an unconditioned signal in the first coaxial cable to provide a conditioned signal to a second coaxial cable, wherein the conditioning means includes:
      means for receiving the DC power, and
      at least one of means for amplifying the unconditioned signal and means for adjusting a strength of the unconditioned signal.

2. The interior unit of claim 1, wherein a current of the lower voltage AC output is less than 1 amp.

3. The interior unit of claim 1, wherein a voltage level of the lower voltage AC output is less than 90 volts.

4. The interior unit of claim 1, wherein:
   the second converting means includes a direct current power supply configured to convert the lower voltage AC output to DC power at one or more voltages, and the connecting means includes:
an input connection configured to connect to the first coaxial cable and to receive from the first coaxial cable the unconditioned signal, and
an output connection, configured to connect to the second coaxial cable and to transmit to the second cable the conditioned signal.

5. The interior unit of claim 1, further comprising:
a direct current power supply configured to convert the lower voltage AC output into DC power at one or more voltages;
a connection configured to connect to telephone wires; and
means for converting between radio frequency signals in the first coaxial cable and analog or digital telephone signals in the telephone wires, the converting means being powered by the DC power.

6. The interior unit of claim 1, further comprising:
a connection configured to connect to a computer network cable;
a direct current power supply configured to convert the lower voltage AC output into DC power at one or more voltages; and
means for converting between radio frequency signals in the first coaxial cable and a digital computer communications signal in the computer network cable, the converting means being powered by the DC power.

7. The interior unit of claim 1, further comprising:
means for electrically isolating a subscriber television network from the lower voltage AC output.

8. An exterior unit of a cable television customer interface, comprising:
a weatherproof enclosure;
an input configured to attach to a first coaxial cable and to receive high voltage AC power from the first coaxial cable;
an output configured to attach to a second coaxial cable and to receive low voltage AC power from the second coaxial cable; and
means for electrically isolating the first coaxial cable from the low voltage AC power in the second coaxial cable, for electrically isolating at least one electronic device contained within the weatherproof enclosure from the high voltage AC power in the first coaxial cable, and for simultaneously conducting radio frequency signals bidirectionally between the first and second coaxial cables.

9. The exterior unit of claim 8, further comprising:
a direct current power supply configured to convert the low voltage AC power from the second coaxial cable into DC power at one or more voltages; and
means for receiving an unconditioned signal from the first coaxial cable, for conditioning the unconditioned signal to produce a conditioned signal, and for transmitting the conditioned signal to the second coaxial cable, wherein the conditioning means includes at least one of means for amplifying the unconditioned signal, means for adjusting a strength of the unconditioned signal, and means for actively filtering out portions of the unconditioned signal.

10. The exterior unit of claim 8, further comprising:
a connection configured to connect to telephone wiring;
a direct current power supply configured to convert the low voltage AC power into DC power; and means for converting between radio frequency signals in the first coaxial cable and telephone signals in the telephone wiring, the converting means being powered by the DC power.

11. The exterior unit of claim 8, further comprising:
a connection configured to connect to a computer network cable;
a direct current power supply configured to convert the low voltage AC power into DC power at one or more voltages; and
means for converting between radio frequency signals in the first coaxial cable and digital computer communication signals, the converting means being powered by the DC power.

12. A customer interface for a cable television system, comprising:
an exterior unit including:
a weatherproof enclosure,
an input configured to attach to a first coaxial cable,
an output configured to attach to a second coaxial cable, and
means for electrically isolating lower voltage AC power in the second coaxial cable from the first coaxial cable, and simultaneously conducting radio frequency signals in both directions between the first and second coaxial cables;
an interior unit including:
an enclosure for the interior unit,
means for connecting the interior unit to standard consumer power to receive higher voltage AC power,
means for converting the higher voltage alternating current AC power into the lower voltage AC power, and
means for connecting the second coaxial cable to the interior unit to receive the lower voltage AC power;
a direct current power supply for converting the lower voltage AC power in the second coaxial cable into DC power at one or more voltages; and
means for modifying the radio frequency signals in the second coaxial cable, the modifying means being powered by the DC power.

13. A cable television network, comprising:
source means for receiving multimedia programs;
one or more optical cable network trees;
a conductor network tree, coextensive with the optical cable network trees;
a head-end including:
one or more laser transmitters for receiving the programs for the source means and transmitting the programs as optical signals into the optical cable networks, and
a central power source for receiving higher voltage alternating current and transmitting lower voltage alternating current through the conductor network tree;
a multitude of coaxial cable network trees;
a plurality of nodes, each of the nodes including one or more optical receivers for receiving the multimedia programs and forward information as optical signals from respective optical network trees and for transmitting the programs and forward information through one or more of the coaxial cable network trees;
a multitude of customer interfaces, each connected to one of the coaxial cable networks, customer interface including an exterior unit and an interior unit, wherein, the exterior unit includes:
a weatherproof enclosure,
an input configured to attach to a first coaxial cable connected to one of the coaxial cable network trees,
an output configured to attach to a second coaxial cable, and
means for electrically isolating low voltage AC power in the second coaxial cable from the first coaxial cable, and simultaneously conducting radio frequency signals in both directions between the first and second coaxial cables, and the interior unit includes:
an enclosure for the interior unit,
an electrical cord configured to connect the interior unit to standard public power to receive higher voltage AC input,
means for converting the higher voltage AC input into the lower voltage AC power,
means for connecting the second coaxial cable to the interior unit to receive the lower voltage AC power, and
means for converting between radio frequency signals and telephone signals;
a direct current power supply for converting the lower voltage AC power from the second coaxial cable into DC power at one or more voltages; and
means for actively modifying the radio frequency signals provided in the second coaxial cable, the modifying means being powered by the DC power.

14. The cable television network of claim 13, wherein:
the head-end further comprises a gateway to an information network for providing forward information and receiving return information,
one or more of the laser transmitters are adapted for receiving the forward information from the gateway and transmitting the forward information as optical signals into the optical cable networks,
the head-end further comprises one or more optical receivers for receiving return information from the connected optical tree as optical signals, and transmitting the information to the gateway,
the nodes further include:
one or more laser transmitters for receiving return information from one or more of the coaxial cable network trees and for transmitting the return information through another one or more of the optical network trees, the laser transmitters being connected to the same coaxial network trees as the optical receivers, and
one or more respective diplex filters for isolating the laser transmitters from the program and forward information signals in the coaxial cable network trees, and
the active modifying means includes at least one of means for amplifying the radio frequency signal, means for adjusting the signal strength of the radio frequency signal, means for filtering out portions of the radio frequency signal, means for converting between the radio frequency signal in one of the coaxial cables and a telephone signal in telephone wiring, and means for converting between the radio frequency signal in one of the coaxial cables and a digital communications signal in a computer network cable.

15. An interior unit of a customer interface for a cable television system, comprising:
means for connecting to an input coaxial cable and for receiving an input television signal through the input cable;
means for connecting to an output coaxial cable and for transmitting a conditioned output television signal through the output cable;
means for receiving alternating current power;
means for providing the input cable with the alternating current power in a reduced-voltage form;
power supply means for converting the alternating current power to direct current power at one or more voltages; and
signal modifying means for receiving the direct current power and for actively modifying the input television signal using the received direct current power to produce the output television signal having significantly different properties than the input television signal, the signal modifying means including at least one of means for amplifying the signal and means for adjusting the signal strength.

16. Exterior equipment of a CATV system, comprising:
means for providing a low voltage AC power to said exterior equipment from a coaxial cable connected to an interior unit;
means for electrically isolating the low voltage AC power from an alternating current power distribution system of the CATV system;
an exterior unit at a customer interface of the CATV system, including:
a weatherproof outdoor enclosure;
a DC power supply within the enclosure for converting the low voltage AC power from the coaxial cable into DC power at one or more voltages; and
electronic equipment within the enclosure configured to operate using the DC power.

17. An interior unit of a cable television customer interface, comprising:
an enclosure for the interior unit;
a first electrical connecter configured to connect the interior unit to standard consumer power to receive higher voltage AC input;
a power converter configured to convert the higher voltage AC input into lower voltage AC output;
a second electrical connector configured to connect the interior unit to a coaxial cable to provide the lower voltage AC output to the coaxial cable;
a power supply configured to convert the lower voltage AC output into DC power; and
an electronic device configured to receive the DC power.

18. The interior unit of claim 17, further comprising:
a power isolator configured to electrically isolate subscriber television network from the lower voltage AC output,
wherein the electronic device is a signal conditioning device.

19. An exterior unit of a cable television customer interface, comprising:
a weatherproof enclosure;
an input configured to attach to a first coaxial cable transferring high voltage AC power;
an output configured to attach to a second coaxial cable transferring low voltage AC power; and
a power isolator configured to electrically isolate the first coaxial cable from the low voltage AC power in the second coaxial cable, to electrically isolate at least one electronic device contained within the weatherproof enclosure from the high voltage AC power in the first coaxial cable, and to simultaneously conduct radio frequency signals bidirectionally between the first and second coaxial cables.

20. A customer interface for a cable television system, comprising:
an exterior unit including:
a weatherproof enclosure,
an input configured to attach to a first coaxial cable,
an output configured to attach to a second coaxial cable, and
a power isolator configured to electrically isolate low voltage alternating current in the second coaxial cable from the first coaxial cable, and to simultaneously conduct radio frequency signals in both directions between the first and second cables;
an interior unit including:
an enclosure for the interior unit,
a first electrical connecter configured to connect the interior unit to standard consumer power to receive high voltage alternating current input,
a power converter configured to convert the higher voltage alternating current input into lower voltage alternating current output, and
a second electrical connector configured to connect the second coaxial television cable to receive the lower voltage alternating current output;
a direct current power supply configured to convert the lower voltage alternating current in the second coaxial cable into direct current at one or more voltages; and
signal conditioning equipment configured to modify the radio frequency signals in the second coaxial television cable, the signal conditioning equipment being powered by the direct current.

21. A cable television network, comprising:
source equipment configured to receive multimedia programs;
one or more optical cable network trees;
a conductor network tree, coextensive with the optical cable network trees;
a head-end including:
one or more laser transmitters configured to receive the programs for the source equipment and to transmit the programs as optical signals into the optical cable networks, and
a central power source configured to receive higher voltage alternating current and to transmit lower voltage alternating current through the conductor network tree;
a multitude of coaxial cable network trees;
a plurality of nodes, each of the nodes including one or more optical receivers configured to receive the multimedia programs and forward information as optical signals from respective optical network trees and to transmit the programs and forward information through one or more of the coaxial cable network trees; and
a multitude of customer interfaces, each connected to one of the coaxial cable networks, each customer interface having:
an exterior unit including:
a weatherproof enclosure,
an input configured to attach to a first coaxial cable connected to one of the coaxial cable network trees,
an output configured to attach to a second coaxial cable, and
a power isolator configured to electrically isolate low voltage alternating current in the second coaxial cable from the first coaxial cable, and to simultaneously conduct radio frequency signals in both directions between the first and second coaxial cables, and
an interior unit including:
an enclosure for the interior unit,
a first electrical connector configured to connect the interior unit to standard public power to receive high voltage alternating current input,
a power converter configured to convert the higher voltage alternating current input into lower voltage alternating current output,
a second electrical connector configured to connect to the second coaxial cable to receive the lower voltage alternating current output, and
a converter configured to convert between radio frequency signals and telephone signals,
a direct current power supply configured to convert the lower voltage alternating current from the second coaxial cable into direct current at one or more voltages, and
signal conditioning equipment configured to actively modify the radio frequency signals provided in the second coaxial television cable, the signal conditioning equipment being powered by the direct current.

22. An interior unit of a customer interface for a cable television system, comprising:
a first electrical connector configured to connect to an input coaxial cable for receiving an input television signal through the input coaxial cable;
a second electrical connector configured to connect to an output coaxial cable for transmitting a conditioned output television signal through the output coaxial cable;
a third electrical connector configured to receive alternating current power;
a power isolator configured to electrically isolate the output coaxial cable from the alternating current power;
a power supply configured to convert the alternating current power to direct current power at one or more voltages; and
signal conditioning equipment configured to receive the direct current power and to actively modify the input television signal to produce the conditioned output television signal having significantly different properties than the input television signal.

23. Exterior equipment of a CATV system, comprising:
a first electrical connector configured to provide a low voltage AC power to said exterior equipment from a coaxial cable connected to an interior unit;
a power isolator configured to electrically isolate the low voltage AC power from an alternating current power distribution system of the CATV system; and
an exterior unit at a customer interface of the CATV system, including:
a weatherproof outdoor enclosure,
a DC power supply within the enclosure configured to convert the low voltage AC power from the coaxial cable into power at one or more voltages, and
electronic equipment within the enclosure configured to operate using the power,
wherein the power isolator is further configured to electrically isolate at least one component of the electronic equipment from high voltage AC power provided by the alternating current power distribution system of the CATV system.

* * * * *